INVENTORS
SYLVESTER H. JAHN &
OPTON F. SMITH
BY
Oldham & Oldham
ATTORNEYS

May 14, 1968
O. F. SMITH ET AL
3,382,550
AUTOMATIC CEMENT ROOF TILE MOLDING MACHINE
Filed July 20, 1965
4 Sheets-Sheet 2
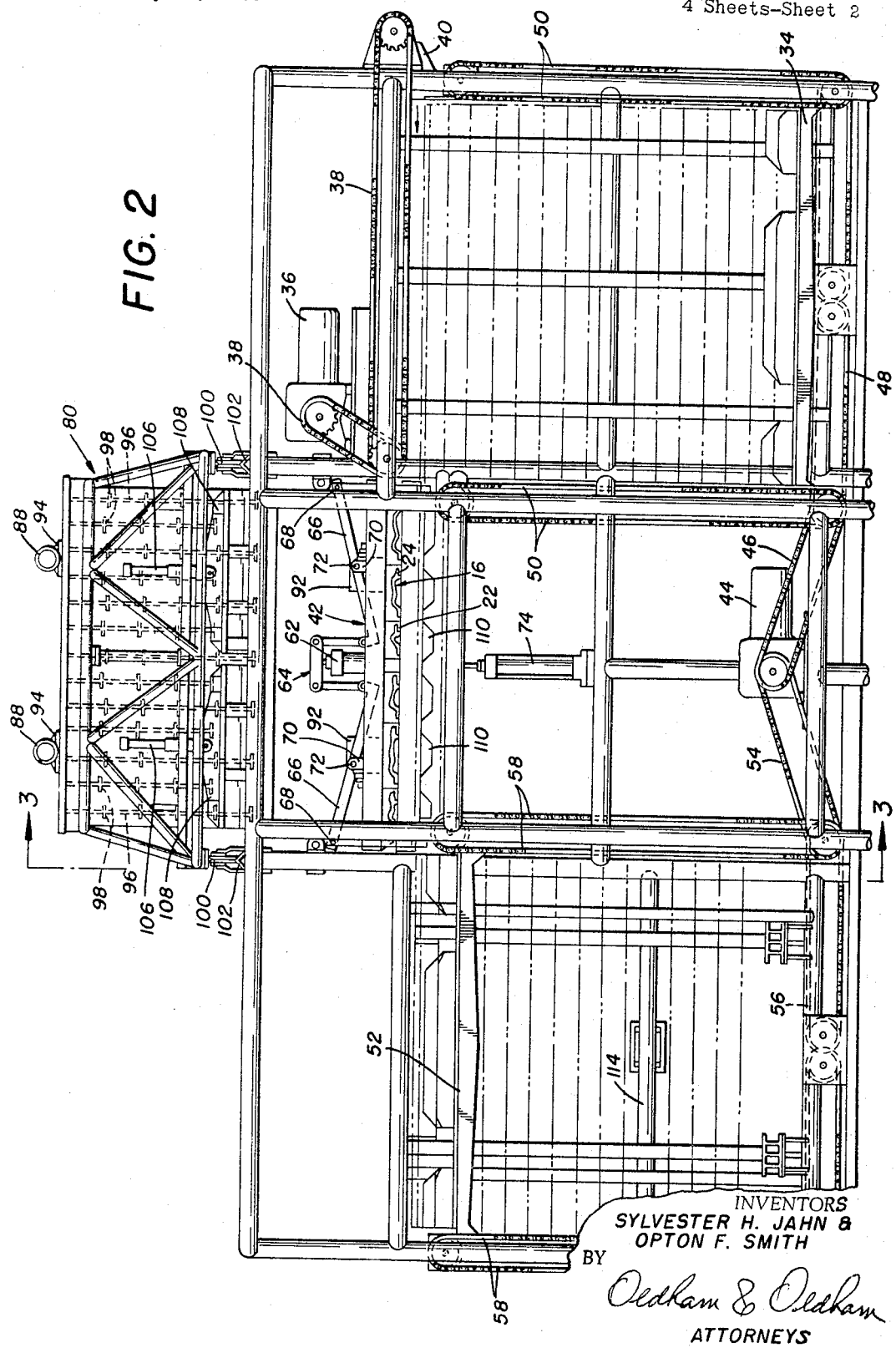
INVENTORS
SYLVESTER H. JAHN &
OPTON F. SMITH
BY
*Oldham & Oldham*
ATTORNEYS May 14, 1968   O. F. SMITH ET AL   3,382,550
AUTOMATIC CEMENT ROOF TILE MOLDING MACHINE
Filed July 20, 1965   4 Sheets-Sheet 3
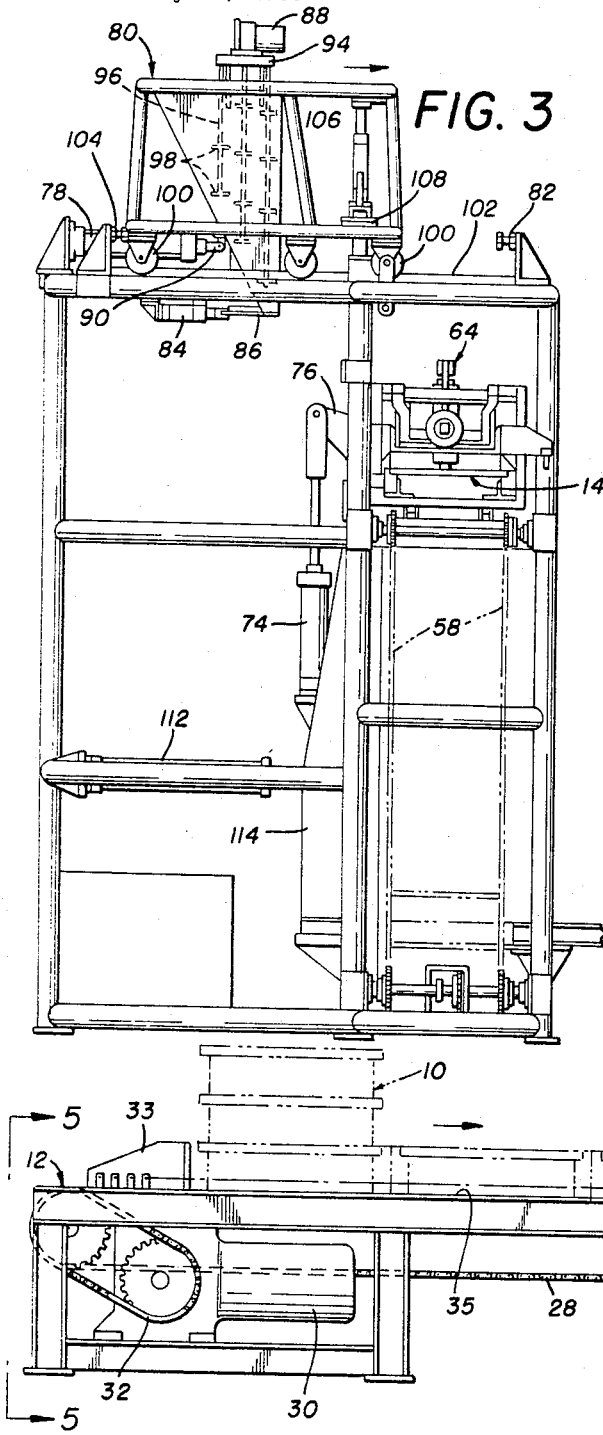
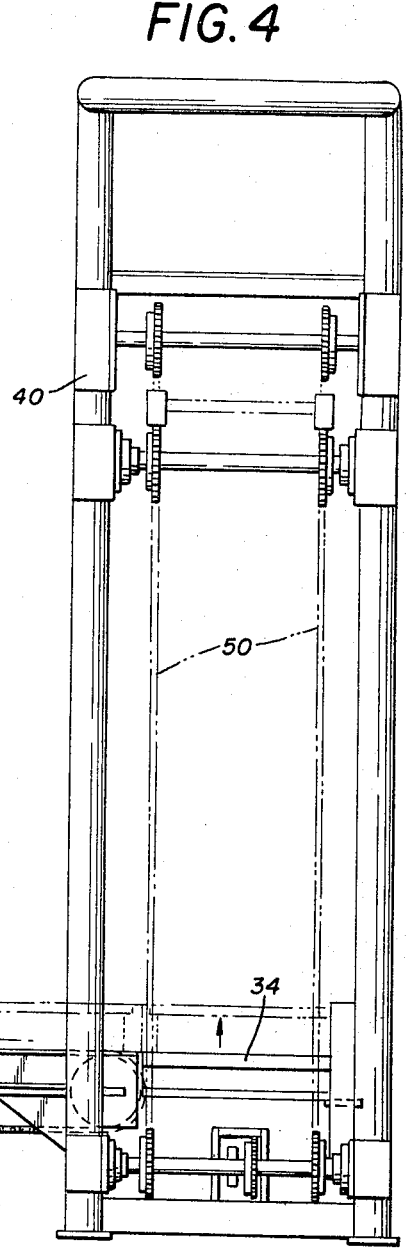
INVENTORS
SYLVESTER H. JAHN &
OPTON F. SMITH
BY
Oldham & Oldham
ATTORNEYS May 14, 1968  O. F. SMITH ET AL  3,382,550
AUTOMATIC CEMENT ROOF TILE MOLDING MACHINE Filed July 20, 1965  4 Sheets-Sheet 4

INVENTORS
SYLVESTER H. JAHN &
OPTON F. SMITH
BY
Oldham & Oldham
ATTORNEYS

United States Patent Office 3,382,550
Patented May 14, 1968

3,382,550
AUTOMATIC CEMENT ROOF TILE
MOLDING MACHINE
Opton F. Smith, 4702 E. Lake Circle, and Sylvester H. Jahn, Box 349–S, both of Sarasota, Fla. 33578
Filed July 20, 1965, Ser. No. 473,463
3 Claims. (Cl. 25—43)

ABSTRACT OF THE DISCLOSURE

An apparatus for producing shake shingles, particularly interlocking shake shingles made of concrete, which includes a pair of vertically movable platforms which move in correspondingly opposite diretcions. One platform supports a stack of male mold carrying platens and provides a feed-in reservoir from which the platens can be fed one by one onto a centralized molding station, while the other platform supports another stack of male mold carrying platens which have already had the cement shingles molded in them at the central station and thereby provides a feed-out reservoir for receiving the platens one by one as they are removed. The invention utilizes a single female mold to service the plurality of male molds which are brought in turn into operative relationship with the female mold in a horizontally positioned relationship at the central station, with the combined molds turned through approximately a 90° angle into the vertical, allowing the molds to be poured with the molds then turned back to substantially a horizontal position and the female mold removed to allow the cast articles to be carried out of the central station on the male mold.

---

The present invention relates to an apparatus for producing shake shingles, and particularly to a shingle or tile making machine which produces interlocking shake shingles made of concrete.

Heretofore there have been various types of machines provided to produce blocks and tiles made of concrete, clay, plastic, and other suitable materials, but there has been no satisfactory production means provided where these hollow shake shingles can be produced from concrete conveniently, inexpensively, and rapidly.

Split wooden shake shingles of cedar, or similar wood, are very expensive in original cost, and production methods for making them have been extremely slow. Therefore the use of these shake shingles has been limited to very expensive homes. Furthermore, wood is not as durable as concrete, interlocking of wooden shake shingles is not practical, and wooden shake shingles do not adapt themselves to hollow air spaces.

The general object of the present invention is to overcome these stated difficulties in the prior art, and to provide an efficient automatic apparatus which produces a practical, inexpensive, attractive and durable shake shingle of concrete. Such a shingle is an attractive exact simulation of the split cedar shake shingle, is easy to install, has interlocking features, is formed with an insulating air space, and is relatively free from all maintenance needs.

Another object of the invention is to provide apparatus producing an interlocking feature in the shingle design which permits the shingles to be installed with a minimum of labor, and also permits the shingles to be removed only by starting at the top, bottom, or side of the roof, giving the roof a solid structure and appearance. The apparatus produces hollow shingles permitting air circulation and/or storage under the shingles which improves the insulation features of the shingles.

Another object of the invention is to provide apparatus which in a single cast provides variations in the width of shingles that are produced, permitting the roofing to take on an appearance of irregularity, this feature adding to the overall attractiveness of the shake shingle roof. This variation is the result of making the molds which form the shingles of different widths so that in a single cast a series of shingles are molded which are uniform in length but not in width.

Another object of the invention is to provide apparatus including a pair of vertically movable platforms which move in correspondingly opposite directions so that while one stack of male mold carrying platens provides a feed-in reservoir from which the platens can be fed one by one into the apparatus of the invention, another stack of male mold carrying platens which has already had the cement shingles molded to them, provides a feed-out reservoir for receiving the platens one by one as they are removed. This permits the machine to be run at maximum efficiency so that the machine need not be stopped in order to load additional mold means.

Another object of the invention is the provision of apparatus of the type described wherein a single female mold services a plurality of male molds which are brought in turn into operative relationship with the female mold.

Another object of the invention is to provide automatic apparatus such as described wherein a female mold is joined to a horizontally positioned male mold, the combined molds are turned through approximately a 90° angle into the vertical, the molds are poured, the upper ends of the cast articles are shaped by means extending into the pour openings in the mold, the molds are turned back to substantially a horizontal position and the female mold is removed, and wherein the cast articles are then carried out of the apparatus on the male mold.

The aforesaid objects of the invention and other objects which will become apparent as the description proceeds are achieved by providing cement casting apparatus for making shingles and the like including a plurality of platens, a plurality of male mold means on each platen, a female mold having a plurality of openings each corresponding with a male mold means, means for moving each platen in turn into spaced relation with the female mold, means for clamping into assembly the female mold and a platen with pour openings at one side of the assembly, means for tilting the assembly to position the openings for pouring, cement hopper means, means to move the hopper means over the openings and to effect gravity pour of the assembly, means for shaping the ends of the poured articles through the mold openings, means for moving the shaping means to and from operating position, means for tilting back the assembly to its original position, means for releasing the female mold from the platen and for moving the female mold into spaced relation with the platen, and means for actuating the platen moving means to move the platen with the cast articles thereon out of the apparatus and to position a next platen in a spaced relation with the female mold whereby the cycle can be repeated.

For a better understanding of the apparatus of the invention, reference should be had to the accompanying drawings wherein:

FIG. 2 is a front elevation of the apparatus illustrated in FIG. 1 with a lower portion of the apparatus, including the platen stock feed-in and feed-out mechanism not included;

FIG. 3 is a vertical sectional view of the apparatus taken on line 3—3 in FIG. 2;

FIG. 4 is a right end elevation of the apparatus of the invention shown in FIG. 2;

While it should be understood that the invention might be utilized for making simulated wood or stone siding, textured flooring, swimming pool coping, Spanish S tile, flat tile, or any other roofing tile, including glazed types, the apparatus was specifically designed to make shake shingles out of poured concrete and hence it has been so illustrated and will be so described.

Figure 6:
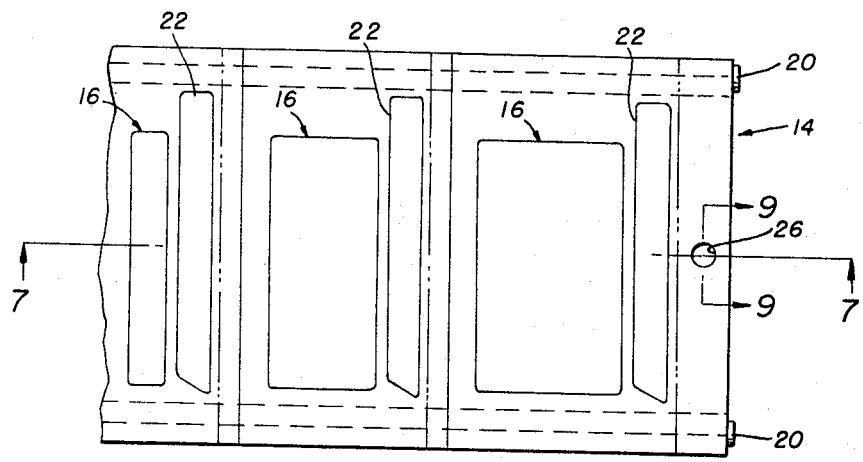
FIG. 6 is a plan view, partially broken away, of a male mold platen used in the apparatus of the invention illustrated in FIG. 1.
Figure 7:
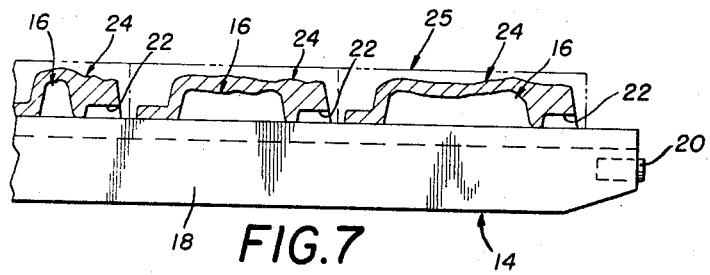
FIG. 7 is a cross sectional view of the platen illustrated in FIG. 6, taken substantially along line 7—7 of FIG. 6.
Figure 8:
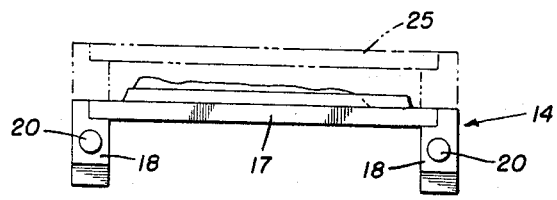
FIG. 8 is an end view of the platen illustrated in FIG. 6.

Reference should first be had to FIGS. 6, 7 and 8 which show the male mold platens forming an important part of the apparatus of the invention. Each platen 14 is constructed of wood or some other suitable material, and includes a flat bed or base 17 which is supported at its longitudinal edges on skids or runners 18. Bumpers 20 preferably are inserted in the end of each skid 18 to permit the platens to be laid end to end and pushed against one another by the bumper means in platen feeding operations as will be described.

A plurality of male mold members 16, on each platen 14 are preferably made up of a stamped sheet metal and are secured to the platen in spaced position as shown to provide laterally-spaced molding means for forming hollow undersides in a plurality of shingles to be cast side by side. A tongue 22 forms a part of each male mold member, and serves the purpose of molding a rabbeting groove on one underside of each shingle which allows each shingle to be interlocked with each other when installed by inserting the longitudinal side of each shingle in this groove formed in the adjacent shingle.

FIG. 7 illustrates how the cement, indicated generally by the numeral 24, is formed over the male mold members 16 and tongues 22, and also generally indicates the female mold 25 which will be hereinafter in greater detail described. Extending vertically through each end of the platen 14 is a hole, indicated by the numeral 26, which permits a stack of the platens 14 to be secured in alignment with each other by inserting a long bar through the hole 26 for temporary holding or handling the platens as a stack.

It is also important to note, that the plurality of male mold members 16, carried on each platen 14, all have the same length but vary considerably in width. The purpose of such an arrangement is to manufacture shingles which are of typically six selected widths, on a single platen in a single casting operation. This provides variation in shingle width and appearance so that when the shingles are installed on a roof a very attractive design is created.

Figure 1:
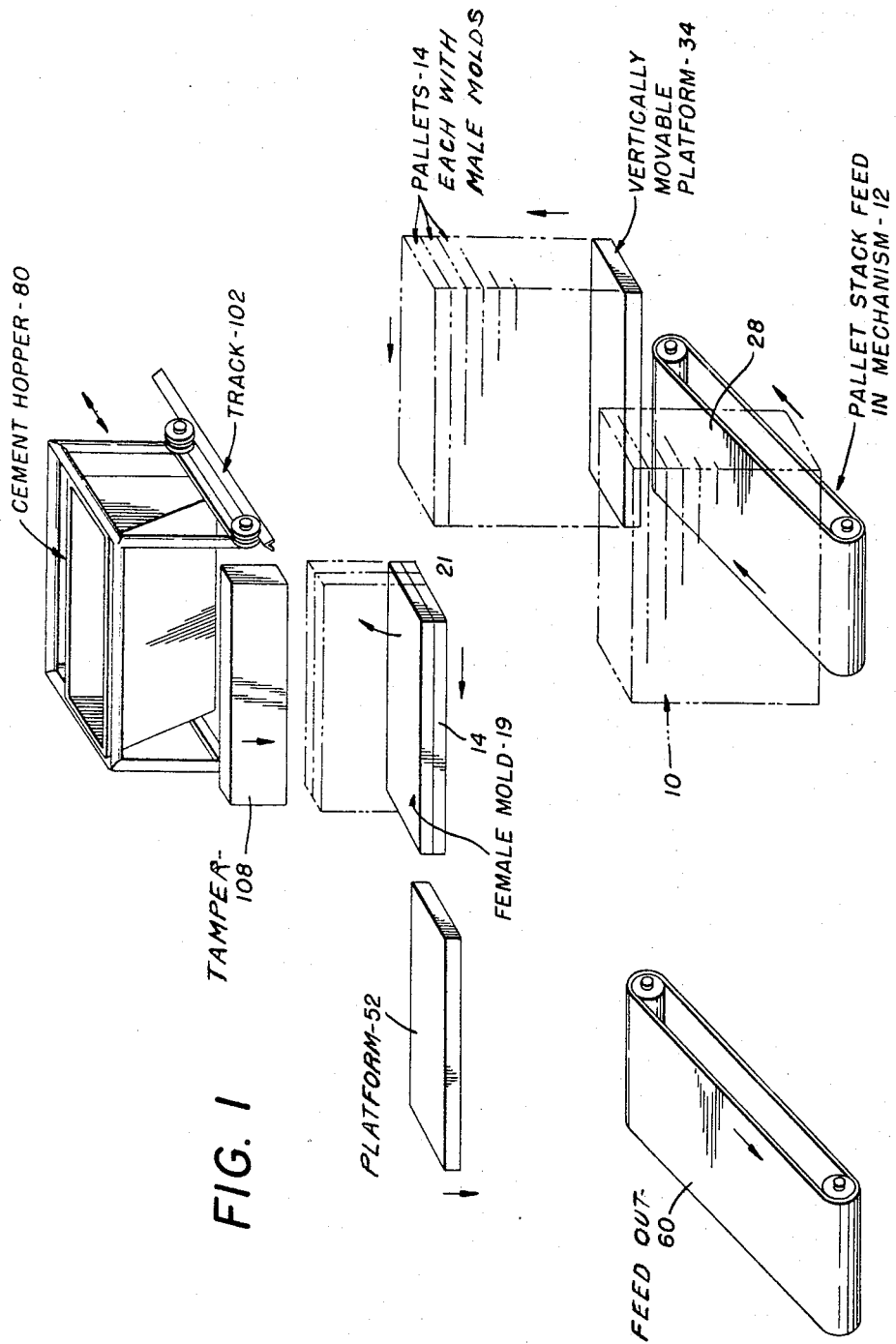
FIG. 1 is a schematic perspective view of one preferred embodiment of the apparatus of the invention.
Figure 5:
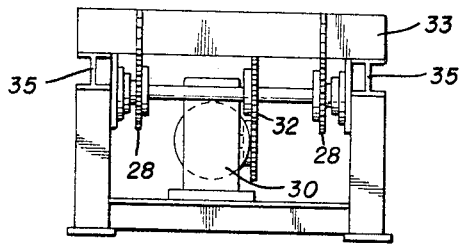
FIG. 5 is an end view of the apparatus of the invention illustrated in FIG. 4, taken along line 5—5 of FIG. 4.
Figure 9:
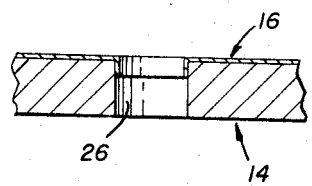
FIG. 9 is a fragmentary, enlarged scale, cross sectional view taken on line 9—9 of FIG. 6.

Now having particular reference to FIG. 1 of the drawings, the structure and operational sequence of the apparatus of the invention will be best understood. Specifically, a plurality of stacks of platens, each stack generally indicated by the numeral 10, are loaded on a platen feed-in conveyor mechanism 12. The feed-in conveyor 12 moves each stack of platens 10 in turn onto a vertically movable platform 34. Mechanism not shown in FIG. 1 then operates to slide the top platen off in a horizontal direction as shown by the arrows and into operative relation vertically beneath a female mold 19. This single female mold acts to service in turn each one of the male mold platens 14 which are fed successively to it.

Mechanism not shown in FIG. 1 then operates to clamp the female mold 19 into operative engagement with the male mold platen 14 positioned in relation to the female mold. The complete mold assembly thus provided is then moved in the direction of the arrow 21 through approximately 90° into a vertical or pouring position. A cement hopper 80 moves on tracks 102 into position vertically above the vertical mold assembly, suitable valve mechanism at the bottom of the hopper are opened and cement is poured into the mold assembly through the respective mold openings thereof.

Now the cement hopper 80 is moved out of the way to the rear of the tracks 102 to bring into alignment with the mold assembly a finishing or tamping head 108 which operates to move down into the mold openings shaped means for shaping and finishing the vertical ends or upper ends of the cast articles.

Now the mold assembly is moved back from the vertical casting position to the horizontal position shown in full lines in FIG. 1, the female mold 19 is released from the male mold platen 14 and the mechanism is operated to again move the top male mold platen from the stack on platform 34 horizontally to push into position beneath the female mold 19 a new male mold platen and to simultaneously push the male mold platen just associated with the female mold out from under the female mold and onto a vertically movable platform 52. It will be recognized that the articles cast in the mold assembly rest on and are carried by the male mold platen moving out onto the platform 52. Before the operation just described can be accomplished it is necessary to raise the platform 34 the height of one male mold platen and to lower the platform 52 a similar distance, and mechanism is provided for this purpose being controlled by microswitches.

Once the platform 52 has been lowered to the bottom of its travel and has received a full stack of male mold platens these are moved off of the platform 52 and onto a feed-out conveyor 60. At this time the platform 34 has been moved to the top of its travel and the last platen has been moved off of the platform. It is now necessary to reverse the position of the platforms 34 and 52 to bring the platform 34 back to its full line position of FIG. 1 in alignment with the top of the feed-in conveyor 12. This brings the platform 52 to its full line position of FIG. 1 in position to receive the next male mold platen pushed out from the casting station. Now a second stack 10 of male mold platens is moved by the feed-in mechanism 12 onto the platform 34 and the operation is repeated.

The apparatus will now be described in greater detail.

The feed-in mechanism 12, best illustrated by FIG. 4, is made up of suitable conveyor belt means 28, usually chains, which are driven by a motor 30 through chain drives 32, in the direction of the arrow indicated in FIG. 4. The conveyor means 28 carry a pushing head 33 which engages with the side of a stack of platens 10, each stack sliding on rails 35 of the feed-in mechanism 12.

The effect of the feed-in action is to move the forward stack of the platens 14 onto a vertically movable platform 34. The apparatus of the invention, is so constructed that when the forward stack of platens 14 is pushed onto the vertically movable platform 34, the bottom platen of the stack makes contact with two microswitches (not shown), the first of which shuts off the motor 30 which drives the platen feed-in mechanism 12, and the second microswitch starts a motor 36, best illustrated by FIG. 2. The motor 36, through chain drives 38, drives a carriage 40 in a lateral direction indicated by the arrow in FIG. 2, and the carriage 40 makes contact with the top platen of the stack of platens carried on the platform 34. The carriage 40 pushes the top platen off of the stack of platen and into spaced relationship with the female mold means 19 of the apparatus of the invention, which are generally indicated by the numeral 42. When the top platen has been pushed by the carriage 40 into this spaced relationship with the female molds 42, the platen contacts three microswitches. The first microswitch stops and reverses the motor 36 which returns the carriage 40 to its original position. The second microswitch activates a motor 44, which through chain drives 46, 48 and 50, cause the vertically movable platform 34 to raise the height of one platen 14.

At the same time that the vertically movable platform 34 is raised by motor 44 a similar vertically movable platform 52 is lowered the height of one platen 14. This is accomplished by chain drives 54, 56, and 58, these chain drives also being driven by motor 44. This vertically movable platform 52 thus operates in a corresponding opposite direction than does vertically movable platform 34 and this is best illustrated by FIG. 2. When vertically movable platform 34 is at its bottom position, and is about to receive a stack of the platens 14, the vertically movable platform 52 is positioned at the top point in its vertical rise. The purpose of such opposed vertically movable platforms is to permit the male mold carrying platens to travel through the molding operation in a quick and efficient manner. This is accomplished by first sliding the top platen of the stack of platens positioned in vertically movable platform 34 into relationship with the female mold means 42 by carriage 40. After the molding operation has taken place, an operation which will be hereinafter described, vertically movable platform 34 is raised the height of one platen, while vertically movable platform 52 is lowered the height of one platen. Carriage 40 then pushes the next platen in the stack into relationship with the female mold means 42, the second platen in the stack pushing by bumper members 20 the first platen, now carrying the formed shingles, onto vertically movable carriage 52. The synchornized relationship of the two vertically movable platforms 34 and 52 thus permit the platens 14 to be automatically fed through the apparatus. There is also associated with vertically movable carriage 52 a similar feed-out conveyor mechanism 60 which carries the shingles formed on the platens to an area where they will be dryed, and taken off the male molds.

The third microswitch which is activated when carriage 40 pushes the first palten on the top of the stack of platens into rleationship under the female mold means 42, activates an air cylinder 62 which functions to clamp the female mold assembly 42 into a fixed, complementary relationship with the male mold means secured to the platen 14. Secured to the air cylinder 62 is a clamp assembly generally indicated by the numeral 64 which serves to lower the female mold member 42 and also raise the assembly after the molding operation has been completed. Lever arms 66 are pivotally secured to the frame means of the apparatus at 68. Pivot arms 70 which are secured to the female mold apparatus 42 have their other ends secured to lever arms 66 at point 72.

After the air cylinder 62 has reached the end of its forward stroke and clamped the female mold apparatus 42 in complementary relationship with the male mold member carried by the platen, the cylinder strikes a microswitch which activates another air cylinder 74. The function of such a cylinder is to rotate through 90° the assembly formed by the clamping of the female mold member 42 and the platen carrying the male mold member 16. This step is best indicated by FIG. 3 and is accomplished by pivotally securing the end of the cylinder 74 to a disc 76, the other end of said disc being secured to the assembly formed by the clamping of the female and male mold members. When the mold assembly has been rotated 90° it contacts another microswitch which activates air cylinder 78.

Air cylinder 78 functions to move a hopper assembly, generally indicated by the numeral 80, in the direction of the arrow in FIG. 3 so as to move it forward over the pour openings in the mold assembly. When the hopper assembly reaches the forward stops 82, the hopper contacts a microswitch which activates air cylinder 84. The purpose of air cylinder 84 is to open the gates 86, permitting the cement in the hopper 80 to flow into the pour openings in the mold assembly.

Air cylinder 84 also acts to contact a microswitch which activates a series of vibraters 88 and 90, best illustrated in FIG. 3, and 92 illustrated in FIG. 2. Vibrater 88 is mounted on a tree assembly 94, and a series of rotatable rods 96 extend from the tree assembly into the hopper 80. Secured thereto are a plurality of disc-shaped members 98. The purpose of the vibraters 88 and 90 is to insure a material flow of cement from the hopper into the mold assembly. The vibrater 92, which is secured to the female mold assembly 42 serves to compact the cement flowing out of the hopper 80 into the mold assembly. The vibraters 88, 90 and 92 operate for a pre-set time cycle and then automatically shut off. At this time cylinder 84 is reactivated to close gates 86 at the bottom of the hopper 80, thus shutting off the flow of cement into the mold assembly. At the end of the cylinder stroke of air cylinder 84, a microswitch is activated to return the hopper 80 back to its original position. The hopper assembly is mounted on wheels 100 which roll on a track 102 to facilitate the movement of the hopper assembly back and forth as the operational sequence of the apparatus of the invention continues.

When the hopper assembly 80 returns to its original position it contacts a stop 104, activating air cylinders 106. Air cylinders 106 have an end finishing or tamper assembly 108 secured to the end thereto, and the air cylinders 106 push the tamper assemblies 108 into the pour openings in the mold assembly to tamp or shape the cement into the molds and also imprinting a design on the shingle ends. When the bottom of the stroke of the air cylinders 106 is reached, another microswitch is contacted, and the air cylinders are returned to their original position, withdrawing the tamper assemblies 108 from the pour openings.

When the tamper assemblies have been fully withdrawn, another microswitch is contacted to activate air cylinder 74, which operates to again rotate the mold assembly 90° on its longitudinal axis, returning it to its original horizontal position. After this operation has been completed, another microswitch activates air cylinder 62, releasing the female mold member 42 from the male mold carrying platen 14. The male mold carrying platen now carrying the cement shingles thereon, is released and comes to a rest on rollers 110 and a microswitch is contacted to restart motors 36. Carriage 40 is again driven laterally by motor 36 and chain means 38 and the next platen in the stack of platens on vertically movable platform 34 is pushed under the female mold. The new platen which is being introduced into relationship with the female mold member, strikes end to end, by bumper means 20, the platen resting on rollers 110 and pushes it out from under the female mold member 42, onto the platform 52. The operational sequence is then repeated.

When this cycle has been repeated fifteen times, all fifteen of the platens in the stack which was originally placed on vertically movable platform 34 have been operated on, and transferred to vertically movable platform 52. After this occurs, a microswitch is contacted to activate air cylinder 112, the stroke of the cylinder 112 acting on a pusher assembly 114 to push the stack of platens onto feed-out conveyor 60. This closes microswitches reversing motor 44 to return platforms 34 and 52 to the positions shown in solid lines in FIG. 1. Motor 30 is then restarted to push a second stack of fifteen platens on platform 34. Thus, the cycle has been completed, all automatically, and is ready to start again with fifteen new male mold platens 14 resting on vertically movable platform 34.

While the apparatus of the invention has been disclosed in detail herein, it will be appreciated that various modifications to the invention could be resorted to without departing from the scope of the invention defined in the appended claims.

What is claimed is:

1. In a cement shingle making apparatus, the combination of
   male mold means,
   female mold means,
   a pair of vertically movable platforms,
   means to move a stack of said male mold means on the first said vertically movable platform,
   means to raise the first said vertically movable platform while the second said vertically movable platform is correspondingly lowered,
   means to slidably remove an individual male mold means from a stack of male mold means,
   means to move said female mold means into a complementary relationship with said individual male mold means,
   means to rotate the male mold means and the female mold means 90° about their longitudinal axis,
   means to pour cement into top end openings in said female mold means and male mold means to fill the mold means,
   tamper means to tamp the cement into the female mold means and male mold means,
   means to rotate the female mold means and male mold means about their longitudinal axis, returning said female mold means and male mold means to their original position,
   means to remove the female mold means from the male mold means, and
   means to move the male mold means on the second vertically movable platform.

2. Cement casting apparatus for making shingles and the like including a plurality of platens, a plurality of male mold means on each platen, a female mold having a plurality of openings each corresponding with a male mold means, a vertically moving platform for moving each platen in turn into spaced relation with the female mold, means for clamping into assembly the female mold and a platen with pour openings at one side of the assembly, means for tilting the assembly away from the platform but so at least one edge remains substantially adjacent the platform to position the openings for pouring, cement hopper means, means to move the hopper means over the openings and to effect gravity pour of the assembly, means for shaping the ends of the poured articles through the mold openings, means for moving the shaping means to and from operating position, means for tilting back the assembly to its original position on the platform means for releasing the female mold from the platen and for moving the female mold into spaced relation with the platen, and means for actuating the platen moving means to move the platen with the cast articles thereon out of the apparatus and to position a next platen in spaced relation with the female mold whereby the cycle can be repeated.

3. In a cement shingle-making apparatus, the combination of
   male mold means,
   female mold means,
   a pair of vertically movable platforms,
   means to move a stack of said male mold means on the first said vertical movable platform,
   means to raise the first said vertical movable platform while the second said vertical movable platform is correspondingly lowered,
   means to slidably remove an individual male mold means from a stack of male mold means,
   means to move said female mold means into a complementary relationship with said individual male mold means,
   means to pour cement into openings in said female mold means and male mold means to fill said mold means,
   tamper means to tamp the cement into the female mold means and male mold means,
   means to remove the female mold means from the male mold means, and
   means to move the male mold means on the second vertically movable platform.

References Cited
UNITED STATES PATENTS

| | | | |
|---|---|---|---|
| 687,688 | 11/1901 | Klay | 25—43 |
| 755,253 | 3/1904 | Strauli | 25—43 |
| 1,701,438 | 2/1929 | Baum et al. | 25—41.5 |
| 1,765,064 | 6/1930 | Eberling | 25—41.5 |
| 2,596,602 | 5/1952 | Roddenberry | 25—42 |

WILLIAM J. STEPHENSON, *Primary Examiner.*